(12) United States Patent
Lee et al.

(10) Patent No.: US 7,538,975 B2
(45) Date of Patent: May 26, 2009

(54) DISK SPACER AND SPINDLE MOTOR ASSEMBLY EMPLOYING THE SAME

(75) Inventors: Chul-woo Lee, Seongnam-si (KR);
Jae-myung Jung, Suwon-si (KR);
Ki-tag Jeong, Hwaseong-si (KR);
Tae-soo Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 222 days.

(21) Appl. No.: 11/138,270

(22) Filed: May 27, 2005

(65) Prior Publication Data

US 2005/0264928 A1   Dec. 1, 2005

(30) Foreign Application Priority Data

May 29, 2004   (KR) ..................... 10-2004-0038722

(51) Int. Cl.
*G11B 17/02* (2006.01)
(52) U.S. Cl. ................................... 360/98.08
(58) Field of Classification Search .......... 720/695–715
See application file for complete search history.

(56) References Cited

U.S. PATENT DOCUMENTS

| 4,562,570 A | 12/1985 | Denton |
| 4,627,288 A | 12/1986 | Guzik |
| 4,918,545 A | 4/1990 | Scheffel |
| 5,025,340 A | 6/1991 | Peters |
| 5,243,481 A | 9/1993 | Dunckley |
| 5,486,962 A | 1/1996 | Boutaghou |
| 5,590,004 A | 12/1996 | Boutaghou |
| 5,694,269 A | 12/1997 | Lee |
| 5,712,746 A | 1/1998 | Moir |

(Continued)

FOREIGN PATENT DOCUMENTS

JP   56-159878   12/1981

(Continued)

OTHER PUBLICATIONS

Korean Office Action issued Dec. 13, 2005, in corresponding Korean Patent Application No. 10-2004-0038722.

(Continued)

*Primary Examiner*—Mark Blouin
(74) *Attorney, Agent, or Firm*—Staas & Halsey LLP

(57) ABSTRACT

Provided are a disk spacer for an information storage device and a spindle motor assembly employing the disk spacer. The spindle motor assembly includes a spindle motor, one or more data storage disks mounted around the spindle motor, a disk clamp coupled to the spindle motor and fixing the disk clamp, and a disk spacer mounted around the spindle motor and supporting the disk, wherein the disk spacer has a groove of a predetermined depth formed along an outer peripheral surface thereof, which does not contact the disks, and the groove is tapered as it is closer to an inner peripheral surface of the disk spacer away from the outer peripheral surface of the disk spacer. Since impacts and vibrations delivered to the disks are scattered by the disk spacer, the wobble of the disk due to the impacts and vibrations is reduced.

10 Claims, 7 Drawing Sheets
(2 of 7 Drawing Sheet(s) Filed in Color)

U.S. PATENT DOCUMENTS

| | | | |
|---|---|---|---|
| 5,724,718 A | 3/1998 | Moir | |
| 5,732,458 A | 3/1998 | Moir | |
| 6,040,649 A | 3/2000 | Horng | |
| 6,339,516 B1 | 1/2002 | Martin | |
| 6,501,617 B1 | 12/2002 | Harada | |
| 6,563,668 B1 * | 5/2003 | Suwito | 360/98.08 |
| 6,567,238 B1 | 5/2003 | Renken | |
| 6,703,584 B2 | 3/2004 | Church | |
| 6,707,637 B1 * | 3/2004 | Codilian et al. | 360/98.08 |
| 6,724,567 B1 * | 4/2004 | Kazmierczak et al. | 360/98.08 |
| 6,757,132 B1 | 6/2004 | Watson | |
| 6,807,721 B2 | 10/2004 | Choo | |
| 6,816,338 B1 * | 11/2004 | Suwito | 360/99.12 |
| 6,967,814 B1 * | 11/2005 | Chessman et al. | 360/99.12 |
| 7,085,098 B1 * | 8/2006 | Yang et al. | 360/97.03 |
| 2001/0012174 A1 * | 8/2001 | Imamura | 360/97.01 |
| 2002/0069509 A1 | 6/2002 | Choo | |
| 2003/0214751 A1 | 11/2003 | Hanssen | |

FOREIGN PATENT DOCUMENTS

| | | |
|---|---|---|
| JP | 2-292786 | 12/1990 |
| JP | 03-183057 | 8/1991 |
| JP | 04-195958 | 7/1992 |
| JP | 06-119697 | 4/1994 |
| JP | 94-6610 | 4/1994 |
| JP | 7-6469 | 1/1995 |
| JP | 7-220351 | 8/1995 |
| JP | 07-262748 | 10/1995 |
| JP | 08-321107 | 12/1996 |
| JP | 08-321108 | 12/1996 |
| JP | 8-339597 | 12/1996 |
| JP | 9-115216 | 5/1997 |
| JP | 2003-6970 | 1/2003 |
| JP | 2003-338102 | 11/2003 |

OTHER PUBLICATIONS

U.S. Appl. No. 10/997,988, filed Nov. 29, 2004, Myung-il Kim, Samsung Electronics Co., Ltd.

European Search Report issued Sep. 27, 2007, in corresponding European Patent Application No. 05001137.8-2210.

* cited by examiner

DISK SPACER AND SPINDLE MOTOR ASSEMBLY EMPLOYING THE SAME

CROSS-REFERENCE TO RELATED APPLICATIONS

This application claims the benefit of Korean Patent Application No. 10-2004-0038722, filed on May 29, 2004, in the Korean Intellectual Property Office, the disclosure of which is incorporated herein in its entirety by reference.

BACKGROUND OF THE INVENTION

1. Field of the Invention

The present invention relates to an information storage device, and more particularly, to a disk spacer, which is interposed between disks for an information storage device to maintain a predetermined interval between the disks, and a spindle motor assembly employing the disk spacer.

2. Description of the Related Art

Apparatuses that store information in computers, such as hard disk drives (HDDs) and optical disk drives (ODDs), record data on a rotating disk that is mounted around a spindle motor, or reproduce data recorded on the rotating disk.

FIG. 1 is a schematic exploded perspective view of a conventional HDD. Referring to FIG. 1, a spindle motor 30 for rotating an upper disk 21 and a lower disk 22, which act as mediums for recording and storing data, and an actuator 40 for moving a read/write head, which reproduces and records data, to a desired position on a disk 20 are mounted on a base member 11 of an HDD.

The spindle motor 30 is mounted on the base member 11. The two disks 21 and 22 may be mounted around the spindle motor 30 as shown in FIG. 1, and one, or three or more disks may be mounted around the spindle motor 30 as well. If a plurality of disks, e.g., two disks 21 and 22 are mounted around the spindle motor 30, a spacer 50 having a ring shape is interposed between the disks 21 and 22 to maintain a predetermined interval between the disks 21 and 22. A clamp 60 is screwed to an upper end portion of the spindle motor 30 with a screw 70 to firmly fix the disks 21 and 22 to the spindle motor 30.

The actuator 40 includes a swing arm 42, which is rotatably coupled to a pivot 41 that is installed on the base member 11, a suspension 43, which is installed on one end portion of the swing arm 42 and elastically biases a slider with the head thereon toward surfaces of the disks 21 and 22, and a voice coil motor (VCM) 45, which rotates the swing arm 42. The VCM 45 is controlled by a servo control system, and rotates the swing arm 42 in a direction according to Fleming's Left Hand Rule due to an interaction between current input to a VCM coil and a magnetic field generated by magnets. That is, if the disk drive is turned on and the disks 21 and 22 begin to rotate, the VCM 45 rotates the swing arm 42 counterclockwise to move the head over the recording surfaces of the disks 21 and 22. On the other hand, if the disk drive is turned off and the disks 21 and 22 stop rotating, the VCM 45 rotates the swing arm 42 clockwise to remove the head from the recording surfaces of the disks 21 and 22. The head removed from the recording surfaces of the disks 21 and 22 is parked on a ramp 46 disposed outside the disks 21 and 22.

A cover member 12 is secured to the base member 11 with a plurality of screws 19. The base member 11 and the cover member 12 secured to the base member 11 collectively enclose and protect the disks 21 and 22, the spindle motor 30, the actuator 40, and so on.

A combination of the spindle motor 30, the disks 21 and 22, the spacer 50, and the clamp 60 will be explained in further detail with reference to FIG. 2.

Referring to FIG. 2, the spindle motor 30 includes a shaft 31 fixedly installed on the base member 11, and a stator 33 and a rotator 34, which are mounted around an outer periphery of the shaft 31. The rotator 34 is called a hub. The disks 21 and 22 for data storage are mounted around an outer periphery of the hub 34. As described previously, if the plurality of disks 21 and 22 are mounted around the spindle motor 30, the ring-shaped spacer 50 is mounted around the outer periphery of the hub 34 to be interposed between the disks 21 and 22 so that the spacer 50 can maintain a predetermined interval between the disks 21 and 22. Then, the clamp 60 for fixing the disks 21 and 22 is screwed to an upper end portion of the shaft 31 with the screw 70.

In the HDD constructed as above, data recording and reproducing is performed by the read/write head, which flies over the rapidly rotating disks 21 and 22 at a very small height. If impacts are applied to the HDD, the impacts are delivered to the disks 21 and 22 through the base member 11, the shaft 31 of the spindle motor 30, the shaft screw 70, and the spacer 50. Vibrations caused due to the rotation of the spindle motor 30 are also delivered to the disks 21 and 22 through the shaft 32, the shaft screw 70, the clamp 60, and the spacer 50. The impacts and vibrations delivered to the disks 21 and 22 cause the disks 21 and 22 to wobble, and accordingly, the disks 21 and 22 collide with the head, thereby damaging the surfaces of the disks 21 and 22 and the head. Further, the wobble of the disks deteriorate the function of the read/write head.

In particular, in the conventional HDD, since the spacer 50 interposed between the disks 21 and 23 has a rectangular section, the impacts or vibrations delivered from the clamp 60 to the upper disk 22 are delivered to the lower disk 21 through the spacer 50, as shown by arrows in FIG. 2. That is, the conventional disk spacer 50 having a rectangular shape cannot lessen impacts or vibrations.

In the meantime, FIG. 3 is a sectional view of a disk spacer having a ⊏-shaped section disclosed in Japanese Patent Laid-Open Publication No. hei 9-115216.

Referring to FIG. 3, a plurality of disks, for example, two disks 81 and 82, a spacer 85, and a clamp ring 84 are mounted around an outer periphery of a motor hub 83. The clamp ring 84 is inserted into a recess 87, which is formed on an outer peripheral surface of the motor hub 83. A spacer groove 86 is formed on an outer peripheral surface of the spacer 85, and the spacer groove 86 has a rectangular section. Consequently, the spacer 85 has a ⊏-shaped section.

According to the conventional spacer 85, an upper projection and a lower projection of the spacer 85, which are formed by the spacer groove 86, act as springs, such that a pressure applied to the disks 81 and 82 is uniformly distributed to the disks 81 and 82 due to the clamp ring 84. However, if impacts or vibrations are applied to the spindle motor, the impacts or vibrations are reflected by the upper projection of the spacer 85, and affect the upper disk 82 again.

For example, the wobble of disks due to impacts under the same conditions was simulated. When the spacer illustrated in FIG. 2 was interposed between disks, the maximum displacement at edge portions of the disks due to the impacts was approximately 1.0 μm, and when the spacer illustrated in FIG. 3 was interposed between disks, the maximum displacement at edge portions of the disks was approximately 1.06 μm. It can be seen from the simulation results that the spacer having the □-shaped section shown in FIG. 3 fails to lessen the wobble of the disks caused by impacts or vibrations.

SUMMARY OF THE INVENTION

Additional aspects and/or advantages of the invention will be set forth in part in the description which follows and, in part, will be apparent from the description, or may be learned by practice of the invention.

Exemplary embodiments of the present invention provide a disk spacer, which has a shape to lessen impacts or vibrations delivered to disks and to reduce the wobble of the disks, and a spindle motor assembly employing the disk spacer.

According to an aspect of the present invention, there is provided a disk spacer including a groove of a predetermined depth formed along an outer peripheral surface of the disk spacer, which does not contact the disks, wherein the groove is tapered as the groove extends from the outer peripheral surface of the disk spacer toward an inner peripheral surface of the disk spacer.

The groove may have a triangular section.

The groove may have a curved inner surface, and in this case, may have a semicircular section.

The disk spacer may be mounted around a spindle motor and may support one or more data storage disks for an information storage device. The one or more data storage disks may be hard disks.

According to another aspect of the present invention, there is provided a spindle motor assembly for an information storage device, the spindle motor assembly comprising: a spindle motor; one or more data storage disks mounted around the spindle motor; a disk clamp coupled to the spindle motor and fixing the disk; and a disk spacer mounted around the spindle motor and supporting the disk, wherein the disk spacer has a groove of a predetermined depth formed along an outer peripheral surface thereof, which does not contact the disks, and the groove is tapered as the groove extends from the outer peripheral surface of the disk spacer toward an inner peripheral surface of the disk spacer. The one or more data storage disks may be hard disks.

The groove may have a triangular section. The groove may have a curved inner surface, which may have a semicircular section.

According to exemplary embodiments of the present invention, since impacts and vibrations applied to the disks are scattered by the disk spacer, the wobble of the disks due to the impacts and vibrations is reduced, and accordingly, collision between the disks and a head and deterioration in the function of the head due to the wobble of the disks are prevented.

BRIEF DESCRIPTION OF THE DRAWINGS

The patent or application file contains at least one drawing executed in color. Copies of this patent or patent application publication with color drawing(s) will be provided by the office upon request and payment of the necessary fee. These and/or other aspects and advantages of the invention will become apparent and more readily appreciated from the following description of the exemplary embodiments, taken in conjunction with the accompanying drawings of which.

DETAILED DESCRIPTION OF THE PREFERRED EMBODIMENTS

Figure 1:
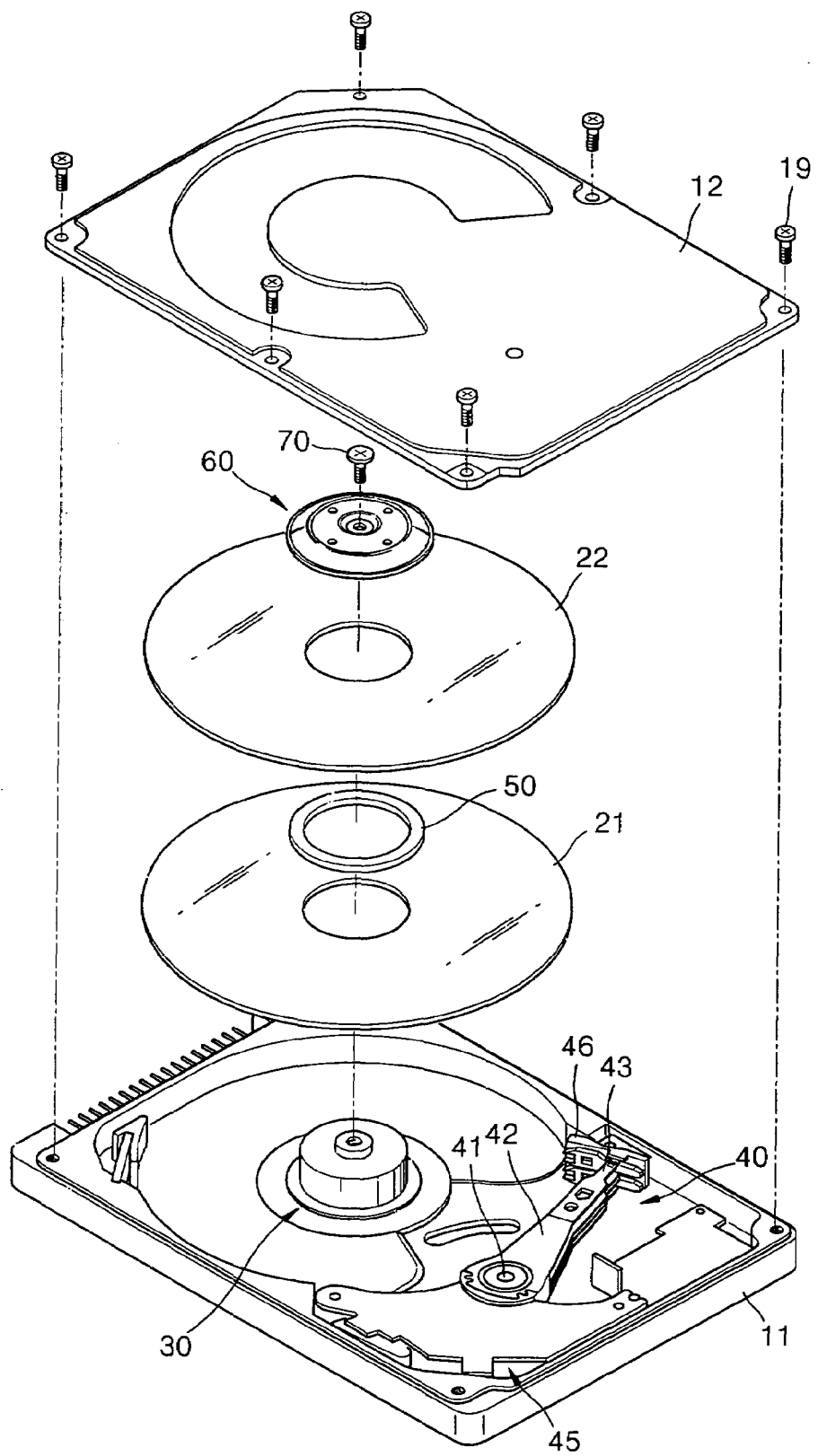
FIG. 1 is an exploded perspective view of a conventional hard disk drive (HDD)

Reference will now be made in detail to the exemplary embodiments of the present invention, examples of which are illustrated in the accompanying drawings, wherein like reference numerals refer to the like elements throughout. The embodiments are described below to explain the present invention by referring to the figures.

Figure 4:
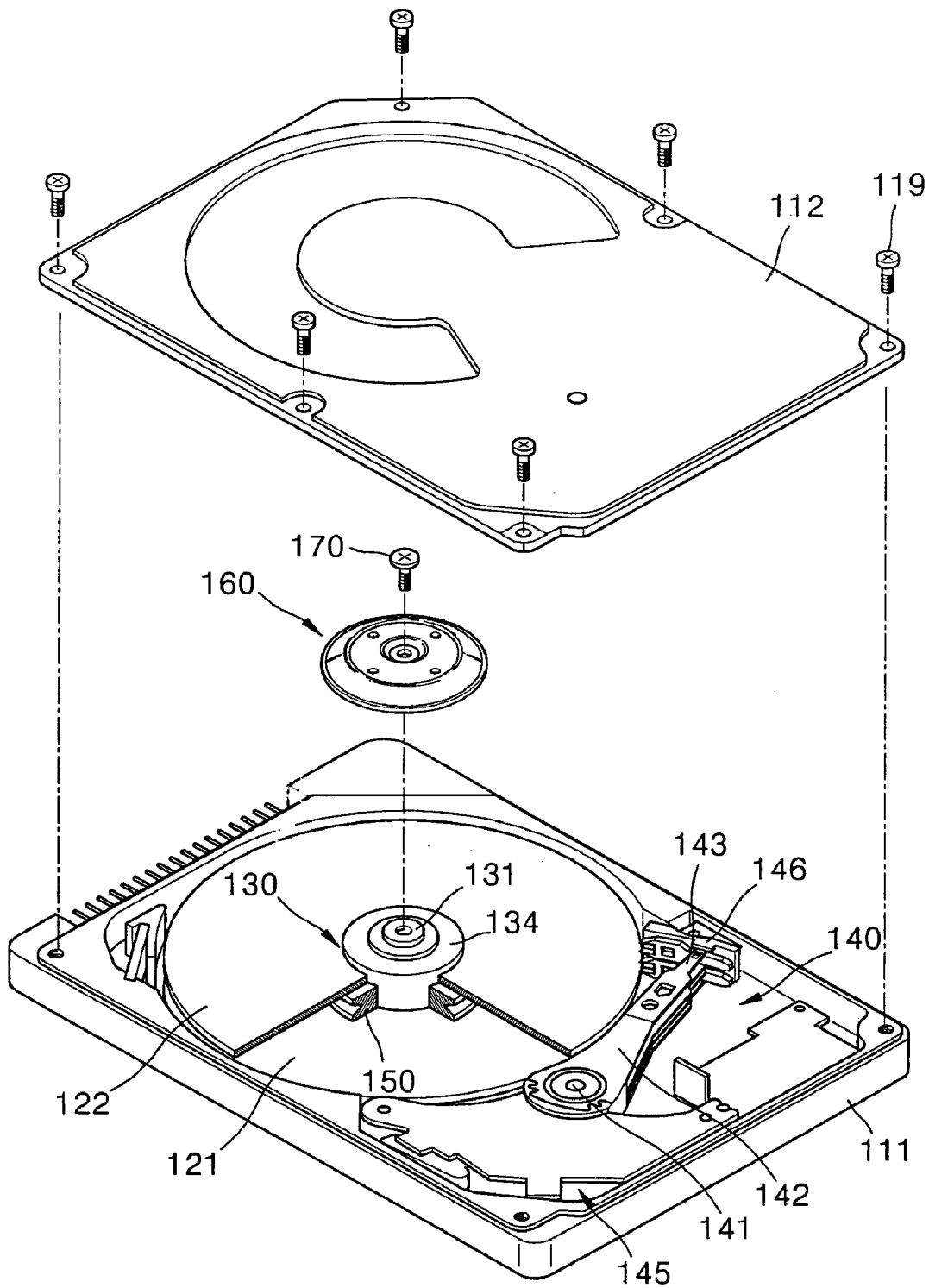
FIG. 4 is an exploded perspective view of an HDD employing a disk spacer, according to an exemplary embodiment of the present invention.
Figure 5:
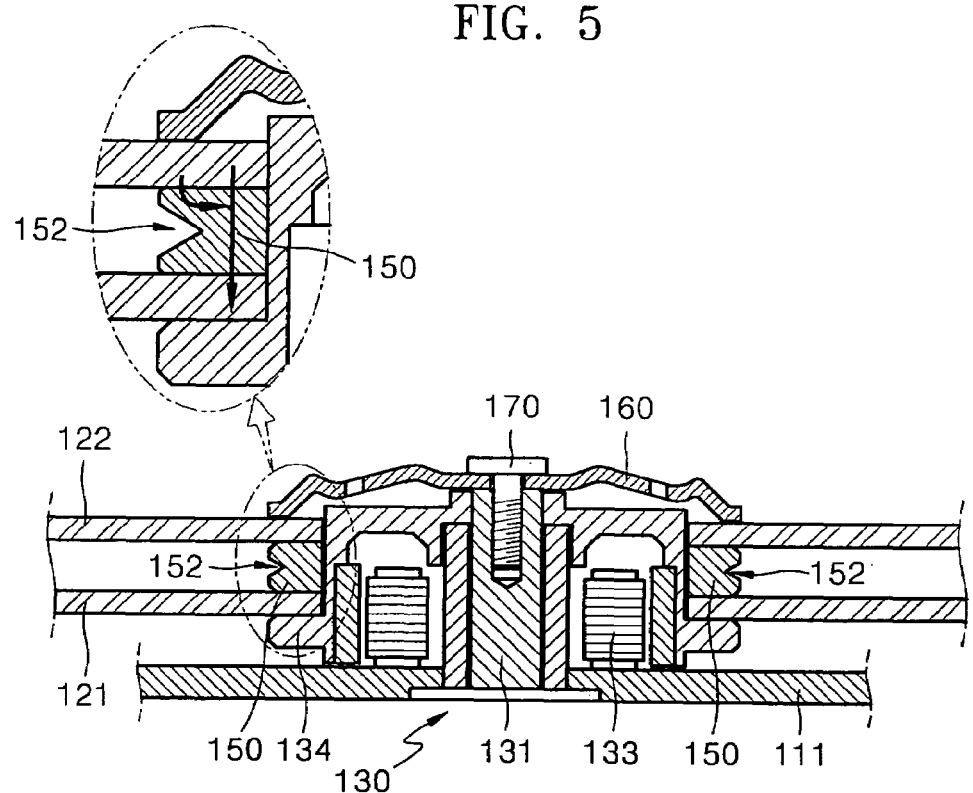
FIG. 5 is a vertical sectional view of a spindle motor assembly on which the spacer, according to the exemplary embodiment illustrated in FIG. 4, is mounted.

FIG. 4 is an exploded perspective view of a hard disk drive (HDD) employing a disk spacer, according to an exemplary embodiment of the present invention, and FIG. 5 is a vertical sectional view of a spindle motor assembly on which the disk spacer, according to the exemplary embodiment illustrated in FIG. 4, is mounted.

Referring to FIGS. 4 and 5, an information storage device, such as an HDD, includes a base member 111, a cover member 112, a spindle motor assembly having one or more disks 121 and 122, which are data storage mediums, and an actuator 140.

The base member 111 is preferably made of aluminium or aluminium alloy, and may be manufactured by die-casting. A space for receiving the spindle motor assembly, the actuator 140, and so on is formed on a top surface of the base member 111.

The cover member 112 is secured to the base member 111 to collectively enclose and protect the disks 121 and 122, a spindle motor 130, the actuator 140, and so on, to prevent dust or humidity from entering the inside of the disk drive, and to prevent noises generated in the disk drive from outwardly propagating.

The spindle motor assembly includes the spindle motor 130, the disks 121 and 122, a disk clamp 160, and a disk spacer 150.

The spindle motor 130 rotates the disks 121 and 122, and is mounted on the base member 111. The spindle motor 130 includes a shaft 131 fixedly installed on the base member 111, a stator 133 mounted around an outer periphery of the shaft 131, and a rotator, namely, a hub 134 disposed outside the stator 133. At least one, e.g., two disks 121 and 122 are mounted around an outer periphery of the hub 134. Although two disks are shown in this exemplary embodiment, it will be appreciated that any number of disks may be a part of the spindle motor assembly.

The disk clamp 160 firmly fixes the disks 121 and 122 to the hub 134 of the spindle motor 130, and is screwed to an upper end portion of the spindle motor 130, that is, an upper end portion of the shaft 131 with a clamp screw 170, to vertically press the disks 121 and 122.

The disk spacer 150 is mounted around the outer periphery of the hub 134 of the spindle motor 130 and supports the disks 121 and 122. In detail, if the plurality of disks 121 and 122 are mounted around the hub 134 of the spindle motor 130, the disk spacer 150 is interposed between the disks 121 and 122 to maintain a predetermined interval between the disks 121 and 122 as described above.

In the exemplary embodiment the present invention shown in FIG. 5, the disk spacer 150 has a ring shape, and has a groove 152 of a predetermined depth formed along an outer peripheral surface thereof, which does not contact the disks 121 and 122. The groove 152 is formed along the outer peripheral surface of the disk spacer 150 and is tapered as it is closer to an inner peripheral surface of the disk spacer 150 away from the outer peripheral surface of the disk spacer 150. The groove 152 is tapered as the groove extends from an outer peripheral surface of the disk spacer toward an inner peripheral surface of the disk spacer. For example, the groove 152 may have a triangular section.

If the disk spacer 150 with the triangular groove 152 along the outer peripheral surface thereof is mounted around the outer periphery of the hub 134 of the spindle motor 130, external impacts or vibrations caused by the rotation of the spindle motor 130 and delivered to the disks 121 and 122 through the base member 111, the shaft 131, the clamp 160, and the disk spacer 150 can be lessened by the disk spacer 150. In further detail, part of the impacts or vibrations delivered to the upper disk 122 through the clamp 160 is scattered toward an inner periphery of the disk spacer 150, that is, toward the hub 134, due to the triangular groove 152 formed on the disk spacer 150, as illustrated by an arrow in FIG. 5. Accordingly, the impacts or vibrations delivered to the disk spacer 150 are prevented from being reflected at the groove 152 to the upper disk 122 and from propagating directly to the lower disk 121. As a result, the wobble of the disks 121 and 122 due to the impacts or vibrations is reduced. This will be explained below again.

The actuator 140 moves a read/write head for recording and reproducing data to a predetermined position on each of the disks 121 and 122, and includes a swing arm 142, a suspension 143, and a voice coil motor (VCM) 145. The swing arm 142 is rotatably coupled to a pivot 141 that is installed on the base member 111. The suspension 143 is coupled to a leading end portion of the swing arm 142 and elastically biases a slider with the head thereon toward a surface of the respective disks 121 and 122. The VCM 145 that provides a driving force for rotating the swing arm 142 is controlled by a servo control system, and rotates the swing arm 142 in a direction according to Fleming3 s Left Hand Rule due to an interaction between current input to a VCM coil and a magnetic filed generated by magnets. That is, if the disk drive is turned on and the disks 121 and 122 begin to rotate, the VCM 145 rotates the swing arm 142 counterclockwise to move the head over the recording surface of the respective disks 121 and 122. On the other side, if the disk drive is turned off and the disks 121 and 122 stop rotating, the VCM 145 rotates the swing arm 142 clockwise to remove the head from the disks 121 and 122. The head removed from the recording surface of the respective disks 121 and 122 is parked on a ramp 146 disposed outside the disks 121 and 122.

Figure 6:
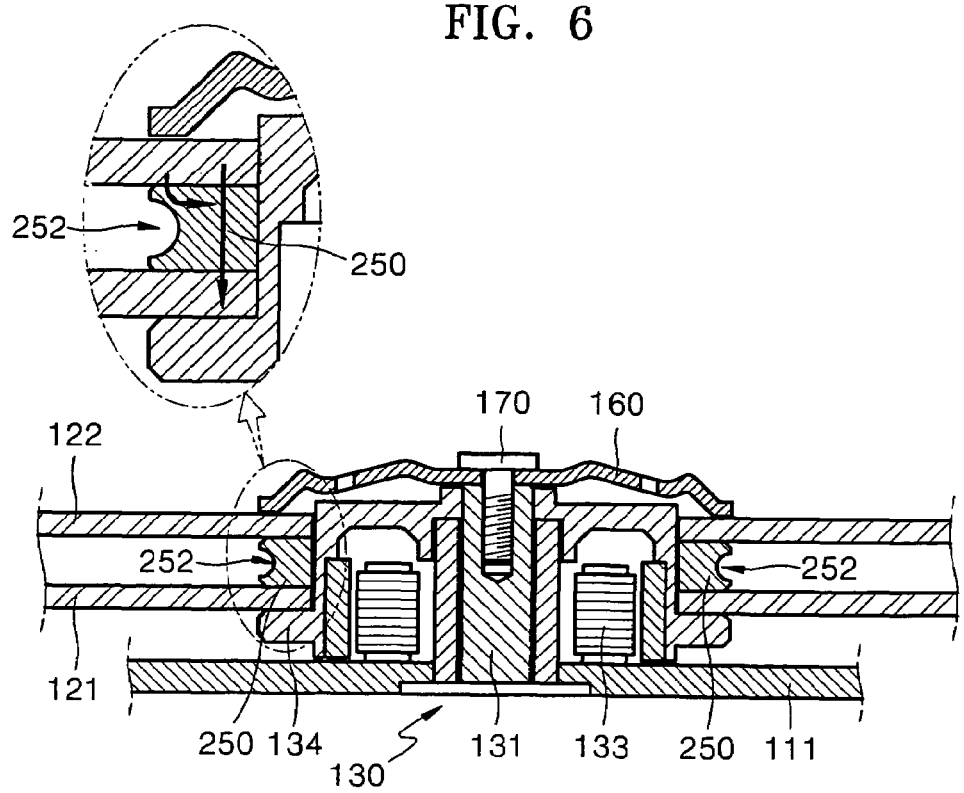
FIG. 6 is a vertical sectional view of the spindle motor assembly on which a spacer, according to another exemplary embodiment of the present invention is mounted.

FIG. 6 is a vertical sectional view of the spindle motor assembly to which a spacer according to another exemplary embodiment of the present invention is mounted. Since the embodiment illustrated in FIG. 6 is only different from the embodiment illustrated in FIG. 4 in the form of a section of a groove formed along an outer peripheral surface of the disk spacer, an explanation will be given focusing on the difference.

Referring to FIG. 6, a disk spacer 250 is mounted around the outer periphery of the hub 134 of the spindle motor 130 to support the disks 121 and 122. The disk spacer 250 has a groove 252 of a predetermined depth formed along an outer peripheral surface thereof. The groove 252 is tapered as it is closer to an inner peripheral surface of the disk spacer 250 away from the outer peripheral surface of the disk spacer 250. In this exemplary embodiment, the groove 252 has a curved inner surface. It is preferable that the groove 252 has a semicircular section.

If the disk spacer 250 with the semicircular groove 252 along the outer peripheral surface thereof is mounted around the outer periphery of the hub 134 of the spindle motor 130 in FIG. 4, the same effect as obtained by the embodiment illustrated in FIG. 5 can be obtained. That is, since impacts or vibrations delivered to the disk spacer 250 are scattered toward an inner periphery of the disk spacer 250 due to the semicircular groove 252 as shown by arrows in FIG. 6, the impacts or vibrations are prevented from being reflected to the upper disk 122 or delivered to the lower disk 121.

Figure 7:
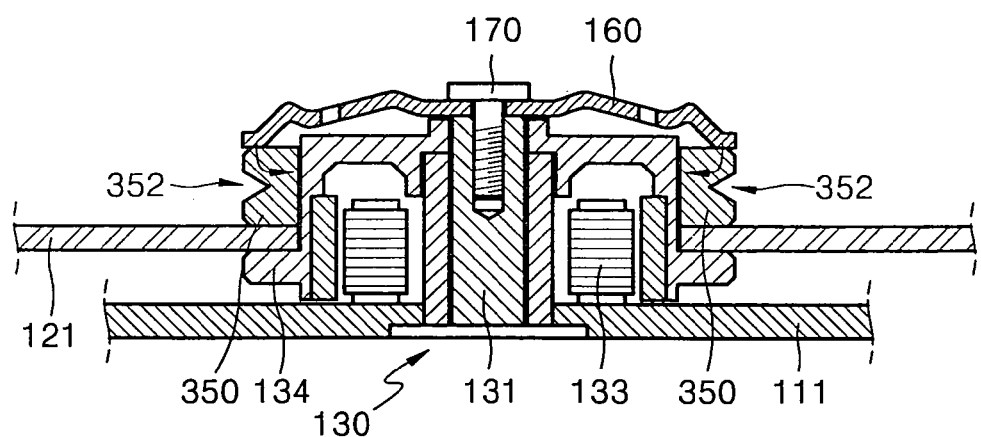
FIG. 7 is a vertical sectional view of the spindle motor assembly on which a spacer, according to still another exemplary embodiment of the present invention and one disk are mounted.

FIG. 7 is a vertical sectional view of the spindle motor assembly to which a spacer according to still another exemplary embodiment of the present invention and one disk are mounted. The present embodiment illustrated in FIG. 7 is only different from the previous embodiment illustrated in FIG. 4 in that one disk is mounted around the spindle motor.

Referring to FIG. 7, only one disk 121 can be mounted around the outer periphery of the hub 134 of the spindle motor 130. In this case, a disk spacer 350 according to another exemplary embodiment of the present invention can be interposed between the disk 121 and the clamp 160. Accordingly, a clamping force of the clamp 160 is applied to the disk 121 through the disk spacer 350. Here, the disk spacer 350 has a height greater by a thickness of the upper disk 122 than heights of the disk spacers 150 and 250 according to the previous embodiments illustrated in FIGS. 5 and 6. The disk spacer 350 has a groove 352 formed along an outer peripheral surface thereof, and the groove 352 may have a triangular section as in the embodiment illustrated in FIG. 5. In the meantime, although not shown, the groove 352 may have a semicircular section as in the embodiment illustrated in FIG. 6 as well.

If the disk spacer 350 with the triangular groove 352 along the outer peripheral surface thereof is interposed between the clamp 160 and the disk 121, the same effect as obtained by the previous embodiments illustrated in FIGS. 4 and 6 can be obtained. That is, since impacts or vibrations delivered to the disk spacer 350 through the clamp 160 are scattered toward an inner periphery of the disk spacer 350 due to the triangular groove 352 as shown by an arrow in FIG. 7, the impacts or vibrations are prevented from being directly delivered to the disk 121 contacting a bottom surface of the disk spacer 350.

Figure 2:
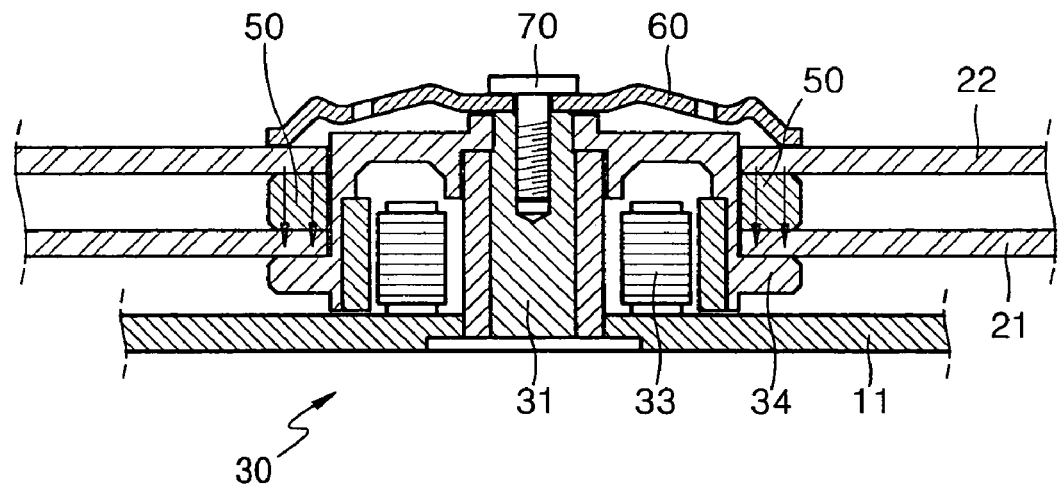
FIG. 2 is a vertical sectional view a combination of a spindle motor, disks, a spacer, and a clamp in the conventional HDD shown in FIG. 1.
Figure 3:
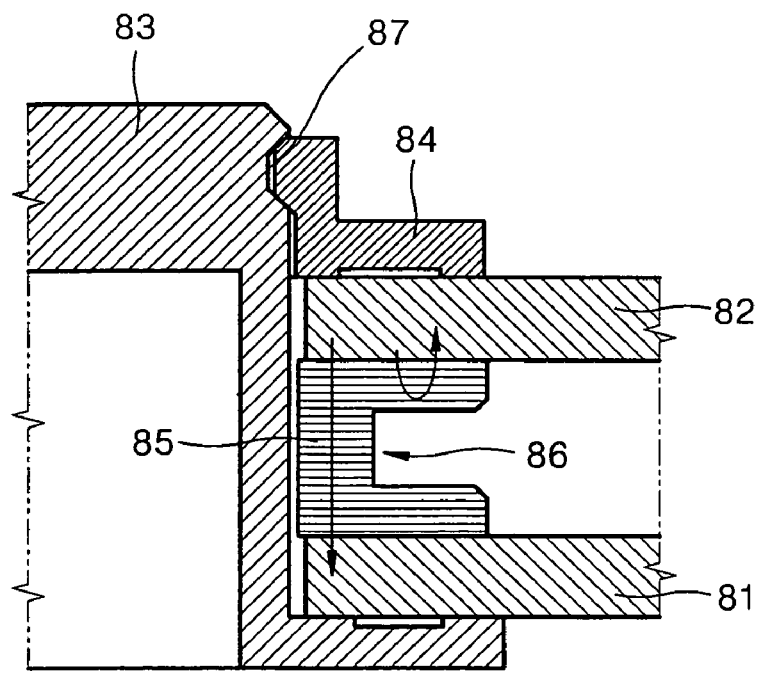
FIG. 3 is a vertical sectional view of a conventional spacer having a z,900 -shaped section.
Figure 8A:
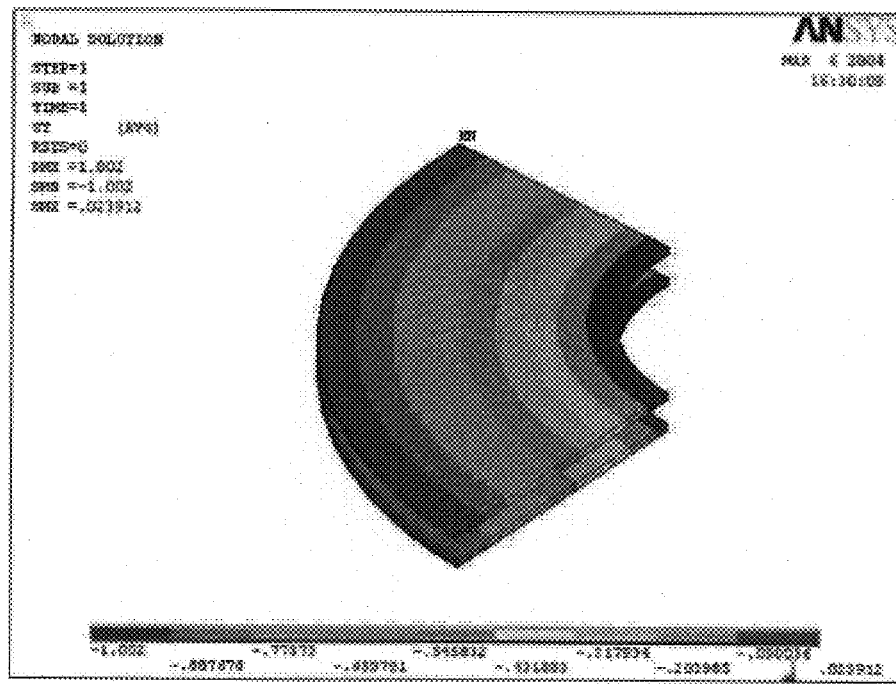
FIGS. 8A and 8B are diagrams illustrating simulation results of the wobble of disks due to impacts, respectively, in the spindle motor employing the conventional spacer illustrated in FIG. 2 and in the spindle motor employing the spacer, according to the present invention.
Figure 8B:
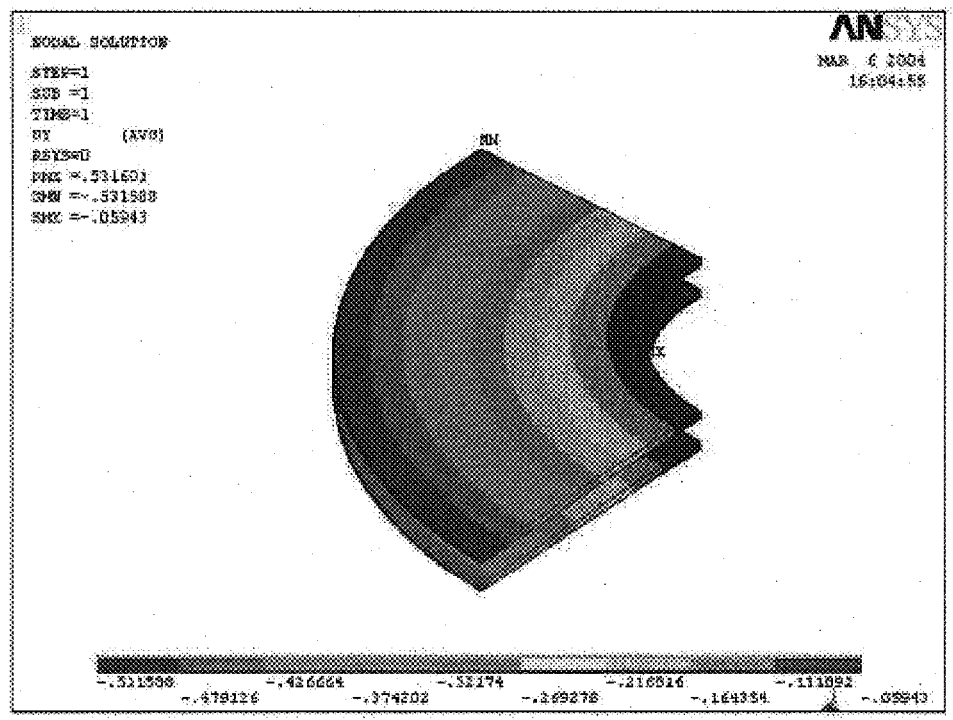

FIGS. 8A and 8B are diagrams illustrating simulation results of the wobble of the disks due to impacts, respectively, in the spindle motor assembly employing the conventional spacer illustrated in FIG. 2 and in the spindle motor assembly employing the spacer illustrated in FIG. 5.

Referring to FIG. 8A, it can be seen that if a conventional spacer having a rectangular section illustrated in FIG. 2 is interposed between disks, the maximum displacement at edge portions of the disks caused due to an impact of about 1000 G is approximately 1.0 μm. Referring to FIG. 8B, it can be seen that if the disk spacer according to the exemplary embodiment of the present invention illustrated in FIG. 5 is interposed between disks, the maximum displacement at edge portions of the disks caused due to an impact of about 1000 G is approximately 0.53 μm. As described previously, the disk spacer according to the exemplary embodiments of the present invention lessens impacts or vibrations delivered to disks, and accordingly, the wobble of the disks is reduced to about half.

As described above, since the groove having a triangular or semicircular section is formed along the outer peripheral surface of the disk spacer, impacts and vibrations delivered to the disks are scattered by the disk spacer. Therefore, the wobble of the disks due to the impacts and vibrations is reduced, thereby preventing collision between the disks and the head and deterioration in the function of the head.

Although a few embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A disk spacer comprising:
    a groove of a predetermined depth formed along an outer peripheral surface of the disk spacer, which does not contact the disks,
    wherein the groove is tapered as the groove extends from the outer peripheral surface of the disk spacer toward an inner peripheral surface of the disk spacer and the groove has a triangular section to reduce displacement of the disks, and
    wherein the disk spacer is mounted around a spindle motor and supports one or more data storage disks for an information device.

2. The disk spacer of claim 1, wherein the one or more data storage disks are hard disks.

3. A disk spacer comprising:
    a groove of a predetermined depth formed along an outer peripheral surface of the disk spacer, which does not contact the disks,
    wherein the groove is tapered as the groove extends from the outer peripheral surface of the disk spacer toward an inner peripheral surface of the disk spacer and the groove has a curved inner surface to reduce displacement of the disks, and
    wherein the disk spacer is mounted around a spindle motor and supports one or more data storage disks for an information device.

4. The disk spacer of claim 3, wherein the groove has a semicircular section.

5. The disk spacer of claim 3, wherein the one or more data storage disks are hard disks.

6. A spindle motor assembly for an information storage device, the spindle motor assembly comprising:
    a spindle motor:
    one or more data storage disks mounted around the spindle motor;
    a disk clamp coupled to the spindle motor and fixing the disk; and
    a disk spacer mounted around the spindle motor and supporting the disk, wherein the disk spacer has a groove of a predetermined depth formed along an outer peripheral surface thereof, which does not contact the disks, the groove is tapered as the groove extends from the outer peripheral surface of the disk spacer toward an inner peripheral surface of the disk spacer, and the groove has a triangular section to reduce displacement of the disks.

7. The disk spacer of claim 6, wherein the one or more data storage disks are hard disks.

8. A spindle motor assembly for an information storage device, the spindle motor assembly comprising:
    a spindle motor:
    one or more data storage disks mounted around the spindle motor;
    a disk clamp coupled to the spindle motor and fixing the disk; and
    a disk spacer mounted around the spindle motor and supporting the disk, wherein the disk spacer has a groove of a predetermined depth formed along an outer peripheral surface thereof, which does not contact the disks, the groove is tapered as the groove extends from the outer peripheral surface of the disk spacer toward an inner peripheral surface of the disk spacer, and the groove has a curved inner surface to reduce displacement of the disks.

9. The spindle motor of claim 8, wherein the groove has a semicircular section.

10. The disk space of claim 8, wherein the one or more data storage disks are hard disks.

* * * * *

UNITED STATES PATENT AND TRADEMARK OFFICE
CERTIFICATE OF CORRECTION

PATENT NO. : 7,538,975 B2　　　　　　　　　　　　　　　　　　　　　Page 1 of 1
APPLICATION NO. : 11/138270
DATED : May 26, 2009
INVENTOR(S) : Chul-woo Lee et al.

It is certified that error appears in the above-identified patent and that said Letters Patent is hereby corrected as shown below:

Column 8, Line 41, change "motor" to --motor assembly--.

Column 8, Line 43, change "space" to --spacer--.

Signed and Sealed this

Thirteenth Day of October, 2009

David J. Kappos
*Director of the United States Patent and Trademark Office*